(12) United States Patent
Magzimof et al.

(10) Patent No.: US 11,705,008 B2
(45) Date of Patent: Jul. 18, 2023

(54) RESTRICTING AREAS AVAILABLE TO AUTONOMOUS AND TELEOPERATED VEHICLES

(71) Applicant: Phantom Auto Inc., Mountain View, CA (US)

(72) Inventors: Shay Magzimof, Palo Alto, CA (US); David Parunakian, Moscow (RU); Michael Kris, Campbell, CA (US)

(73) Assignee: Phantom Auto Inc., South San Francisco, CA (US)

( * ) Notice: Subject to any disclaimer, the term of this patent is extended or adjusted under 35 U.S.C. 154(b) by 0 days.

(21) Appl. No.: 17/503,181

(22) Filed: Oct. 15, 2021

(65) Prior Publication Data

US 2022/0036737 A1     Feb. 3, 2022

Related U.S. Application Data

(63) Continuation of application No. 16/442,445, filed on Jun. 14, 2019, now Pat. No. 11,176,831.

(60) Provisional application No. 62/685,809, filed on Jun. 15, 2018.

(51) Int. Cl.
*G05D 1/02* (2020.01)
*G05D 1/00* (2006.01)
*G08G 1/00* (2006.01)

(52) U.S. Cl.
CPC ......... *G08G 1/207* (2013.01); *G05D 1/0038* (2013.01); *G05D 1/0214* (2013.01); *G05D 2201/0213* (2013.01)

(58) Field of Classification Search
CPC ............. G08G 1/207; G08G 1/096775; G08G 1/096725; G05D 1/0038; G05D 1/0214; G05D 2201/0213
See application file for complete search history.

(56) References Cited

U.S. PATENT DOCUMENTS

| | | | |
|---|---|---|---|
| 10,053,088 B1* | 8/2018 | Askeland | B60W 40/109 |
| 10,386,836 B2 | 8/2019 | Lockwood et al. | |
| 2019/0001191 A1 | 1/2019 | Lockwood et al. | |
| 2019/0011910 A1* | 1/2019 | Lockwood | G05D 1/0038 |
| 2019/0049948 A1 | 2/2019 | Patel et al. | |
| 2019/0232973 A1 | 8/2019 | Volkow | |

OTHER PUBLICATIONS

United States Office Action, U.S. Appl. No. 16/442,445, dated Mar. 31, 2021, 19 pages.

* cited by examiner

*Primary Examiner* — Rodney A Butler
(74) *Attorney, Agent, or Firm* — Fenwick & West LLP (57) ABSTRACT

A vehicle policy server maintains a set of policies for constraining operations of one or more remote vehicles. The policies may specify areas, locations, or routes that specified vehicles are restricted from accessing based on a set of acquired information. An application programming interface (API) enables programmatic updates of the policies or related information. Policies may be enforced by transmitting control signals fully or in part to onboard vehicle computers or to a teleoperation support module providing remote support to the vehicles using human teleoperators and/or artificial intelligence agents. The control signals may directly control the vehicles or teleoperation, or may cause a navigation system to present known restrictions in a suitable fashion such as generating an augmented reality display or mapping overlays.

20 Claims, 4 Drawing Sheets

RESTRICTING AREAS AVAILABLE TO AUTONOMOUS AND TELEOPERATED VEHICLES

CROSS-REFERENCE TO RELATED APPLICATIONS

This application is a continuation of U.S. patent application Ser. No. 16/442,445 filed on Jun. 14, 2019, which claims the benefit of U.S. Provisional Patent Application No. 62/685,809, filed on Jun. 15, 2018, the contents of which are incorporated by reference herein.

BACKGROUND

Technical Field

This disclosure generally relates to a technique for imposing permanent, temporary, or conditional restrictions on the geography available to a teleoperated or autonomous vehicle.

Description of the Related Art

Recent advances in wireless networks, computing and sensor hardware, and machine learning methods have enabled rapid progress in autonomous and remotely controlled vehicle technologies, which are in turn likely to have a significant impact on the way transportation systems are developed and utilized. As this nascent industry matures, it may become desirable to impose restrictions on actions available to intelligent transport systems (ITS) to increase transportation efficiency, avoid accidents, and comply with laws and regulations.

SUMMARY

A method restricts navigation of a vehicle via interactions with a remote server. A policy database stores a set of policies specifying rules relating to navigation of the vehicle. Input data relating to a first state of the vehicle is obtained and a set of one or more applicable policies is determined that apply to the vehicle based on the obtained state of the vehicle. The set of one or more applicable policies are enforced to generate controls that constrain the navigation of the vehicle. For example, policies may be enforced by transmitting the controls to an autonomous drive system of the vehicle to cause the autonomous drive system to automatically control the vehicle according to the first set of one or more applicable policies. Alternatively, controls may be transmitted to a guided navigation system of the vehicle to cause the guided navigation system to automatically display navigation guidance consistent with the first set of one or more applicable policies. In other embodiments, policies may be enforced by transmitting the controls to a remote support server providing remote teleoperation support for the vehicle. The remote support server may either display navigation information to a teleoperator or enable a teleoperation system to automatically generate controls for controlling the vehicle.

DETAILED DESCRIPTION

A vehicle policy server maintains a set of policies for constraining operations of one or more remote vehicles. The policies may specify areas, locations, or routes that specified vehicles are restricted from accessing based on a set of acquired information. An application programming interface (API) enables programmatic updates of the policies or related information. Policies may be enforced by transmitting control signals fully or in part to workstations of human teleoperators or artificial intelligence agents providing remote support to the vehicles, or onboard vehicle computers. The control signals may directly control the vehicles or teleoperation, or may cause a navigation system to present known restrictions in a suitable fashion such as generating an augmented reality display or mapping overlays.

Figure 1:
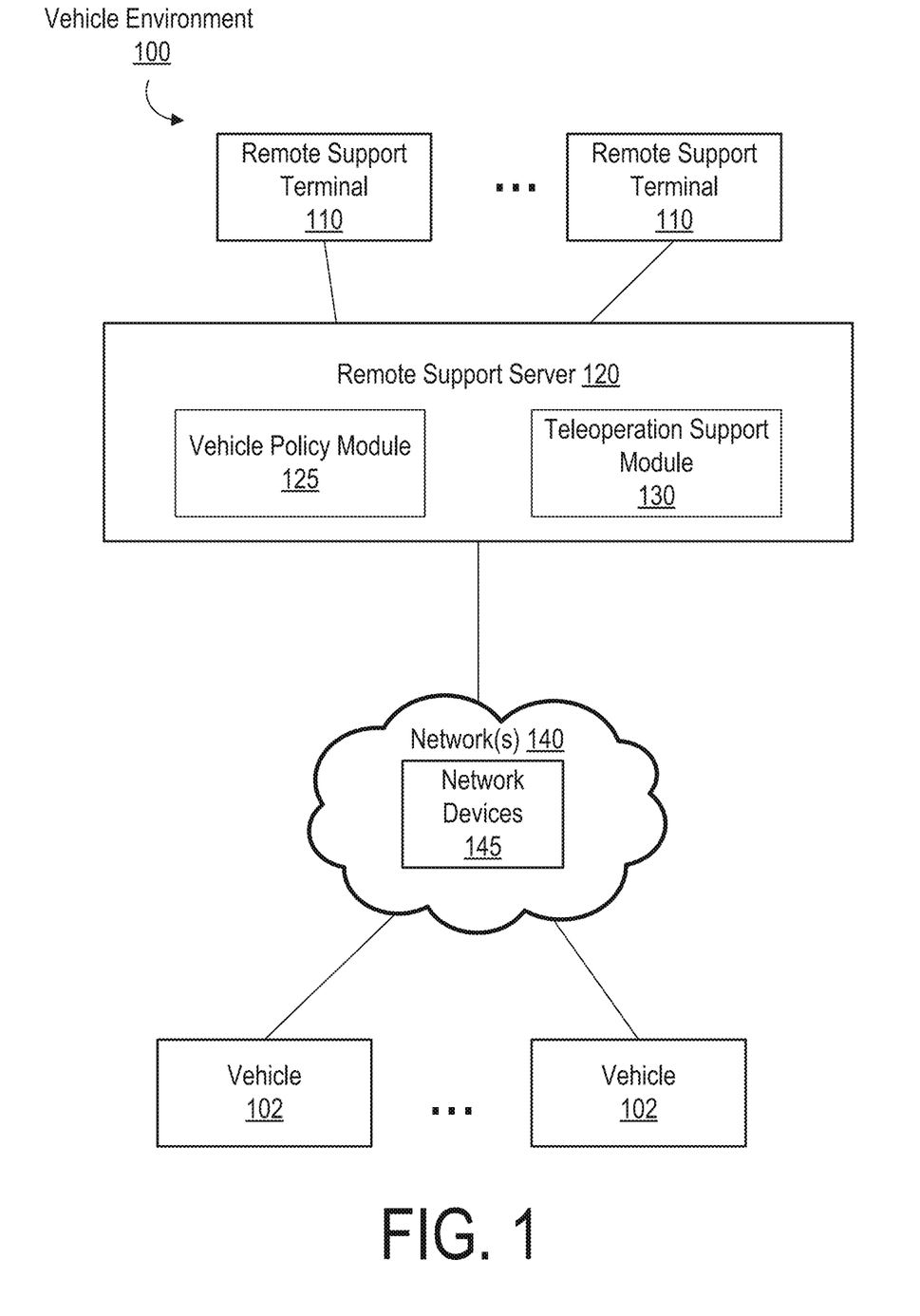
FIG. 1 is a block diagram illustrating a vehicle environment for restricting areas available to a vehicle based on policies stored at a remote server.

FIG. 1 is a block diagram of a vehicle environment 100 including a plurality of vehicles 102, a remote support server 120 supporting one or more remote support terminals 110, and one or more networks 140 comprising network devices 145. In alternative embodiments, the vehicle environment 100 may include different or additional components.

The vehicle 102 comprises a land vehicle (e.g. a car or truck), a seaborne vehicle, a subterranean vehicle, an airborne vehicle, or other vehicle. The vehicle 102 may comprise an intelligent transport system (ITS) that connects to one or more networks 140 and communicates with one or more entities via the one or more networks 140 (e.g., the remote support server 120 and/or other vehicles 102) to enable the vehicle 102 to obtain information useful to safe navigation of an environment. In an embodiment, the vehicle 102 may comprise an autonomous or semi-autonomous vehicle that includes an autonomous driving system that automatically controls navigation based on sensed environment conditions. Alternatively, the vehicle 102 may include a non-autonomous vehicle that relies on control inputs from a driver in the vehicle 102 or from the remote support server 120. In the case of teleoperation, the vehicle 102 wirelessly receives control inputs via the one or more networks 140 that control various components of the drive system such as the steering system, acceleration, braking, etc. The vehicle 102 may also comprise various sensors that capture image data and other environmental data that may be streamed over one or more networks 140 to a remote support server 120 or to other vehicles 102.

The remote support server 120 includes a teleoperation support module 130 that communicates with a vehicle 102 to provide remote teleoperation or other support services. In an embodiment, the teleoperation support module 130 may provide teleoperation support in instances when extra assistance is desired. For example, the vehicle 102 may request teleoperation assistance from the teleoperation support module 130 when one or more vehicle sensors fail, when an unknown problem occurs with the vehicle's autonomous driving software, when the vehicle 102 encounters a barrier or other hazardous road conditions, or when a passenger manually requests remote assistance. Furthermore, the teleoperation support module 130 may provide teleoperation support when the vehicle 102 enters a geographic region where it is not legally permitted to operate in a completely autonomous way. Upon requesting remote support, a video stream capturing the vehicle environment may be provided by the vehicle 102 to the teleoperation support module 130 and presented at a remote support terminal 110. A human teleoperator at the remote support terminal 110 may view the video stream on a display to assess the situation and take appropriate action via a control input device at the remote support terminal 110. In this embodiment, the teleoperation support module 130 may present real-time video streamed from the vehicle 102 to a display of the remote support terminal 110 and may provide real-time control data to the vehicle 102 received via the remote support terminal 110 to enable the teleoperator remotely drive the vehicle 102. Alternatively, the teleoperation support module 130 may comprise an artificial intelligence agent that does not necessarily require a remote support terminal 110 with a display or physical controls for providing human input. Here, the teleoperation support module 130 may provide control instructions to the vehicle 102 directly based on the processing of a real-time video feed and other sensor data streamed to the teleoperation support module 130 from the vehicle 102 without necessarily utilizing any human input. In alternative embodiments, the teleoperation support module 130 may comprise a semi-robotic agent that interacts with a remote support terminal 110 in a similar manner as a human teleoperator.

In other embodiments, the remote support server 120 may provide different support to the vehicle 102 that does not necessarily involve teleoperation. For example, the remote support server 120 may provide voice support to a driver or passenger of the vehicle 102 in response to video or other sensor data received from the vehicle 102. In other cases, the remote support server 120 may provide navigation services to re-route a vehicle 102 or otherwise assist a vehicle 102 in navigating to a destination. In other examples, the remote support server 120 may provide software or firmware updates to a vehicle 102.

The remote support terminals 110, if present, may be coupled to the remote support server 120 via a local area network connection, a direct wired connection, or via a remote connection through the network 140. In embodiments, where the teleoperation support module 130 operates entirely as an artificial intelligence agent without human intervention, the remote support terminals 110 may be omitted.

The vehicle policy module 125 establishes and supports a set of policies that constrain operation of the vehicles 102, either directly or by placing constraints on a teleoperator supporting a vehicle 102. For example, the vehicle policy module 125 may implement geofencing policies that specify where a vehicle 102 can or cannot travel. Furthermore, the vehicle policy module 125 may implement policies that control other aspects of a vehicle 102 such as vehicle speed, permitted or forbidden hours of operations, permitted or forbidden passengers, etc. Policies may be specified in a manner that is vehicle and/or passenger specific. Furthermore, policies may be specified that control a vehicle 102 in a manner that adapts to varying input conditions, such as time of day, passengers in the vehicle, location of the vehicle 102, whether or not the vehicle 102 is under teleoperation control, identity of the teleoperator, or other factors. The vehicle policy module 125 may enforce a policy by sending control signals directly to a vehicle 102 that cause the vehicle 102 to operate in a manner consistent with policy. Alternatively, a policy may be enforced by sending instructions to the teleoperation support module 130 to enable a human teleoperator or artificial intelligence agent to carry out the instructions (or choose to ignore them). In another embodiment, instructions may be sent to a navigation system of a vehicle 102 to be carried out by a driver of the vehicle 102, if desired.

The plurality of networks 140 represents the communication pathways between the vehicles 102, the remote support terminals 110, and the remote support server 120. In one embodiment, the networks 140 use standard communications technologies and/or protocols and can include the Internet. In another embodiment, the entities on the networks 140 can use custom and/or dedicated data communications technologies. The plurality of networks 140 may comprise networks of different types such as, for example, a public cellular connection, a dedicated or private wireless network, a low-latency satellite uplink, VANET wireless channels (including vehicle-to-vehicle or vehicle-to-infrastructure links), or any combination thereof Furthermore, the plurality of networks 140 may include multiple networks of the same type operated by different service providers. The network devices 145 may include cell towers, routers, switches, LEO satellite uplink devices, WiFi hotspot devices, VANET devices, or other components that provide network services to the entities connected to the plurality of networks 140. The network devices 145 may be integrated into roadside infrastructure units that are integrated with traffic devices or other roadside systems. The network devices 145 may have varying capabilities and may be spread over a wide geographic area. Thus, different allocations of network resources may be available to vehicles 102 in different locations at different times depending on environmental factors, the capabilities of different network devices 145, and congestion in the area.

In an embodiment, data from a vehicle 102 may be transmitted directly to the remote support server 120 via the one or more networks 140. In other embodiments, a gateway associated with a vehicle 102 may push updates to multiple subscribing services that may include the vehicle policy module 125 and the teleoperation support module 130.

In an embodiment, multiple instances of the vehicle policy module 125 or components thereof may execute concurrently to provide support to different vehicles 102. Other components of the vehicle policy module 125 may support multiple vehicles 102 concurrently. Furthermore, in various embodiments, components of the vehicle policy module 125 and the teleoperation support module 130 may execute on the same server or on separate servers that may be remote from each other. In further embodiments, one or more components of the vehicle policy module 125 may instead operate on a vehicle 102. The vehicle policy module 125 and the teleoperation support module 130 may be implemented as one or more non-transitory computer-readable storage mediums that stores instructions executed by one or more processors to perform the functions attributed herein.

Figure 2:
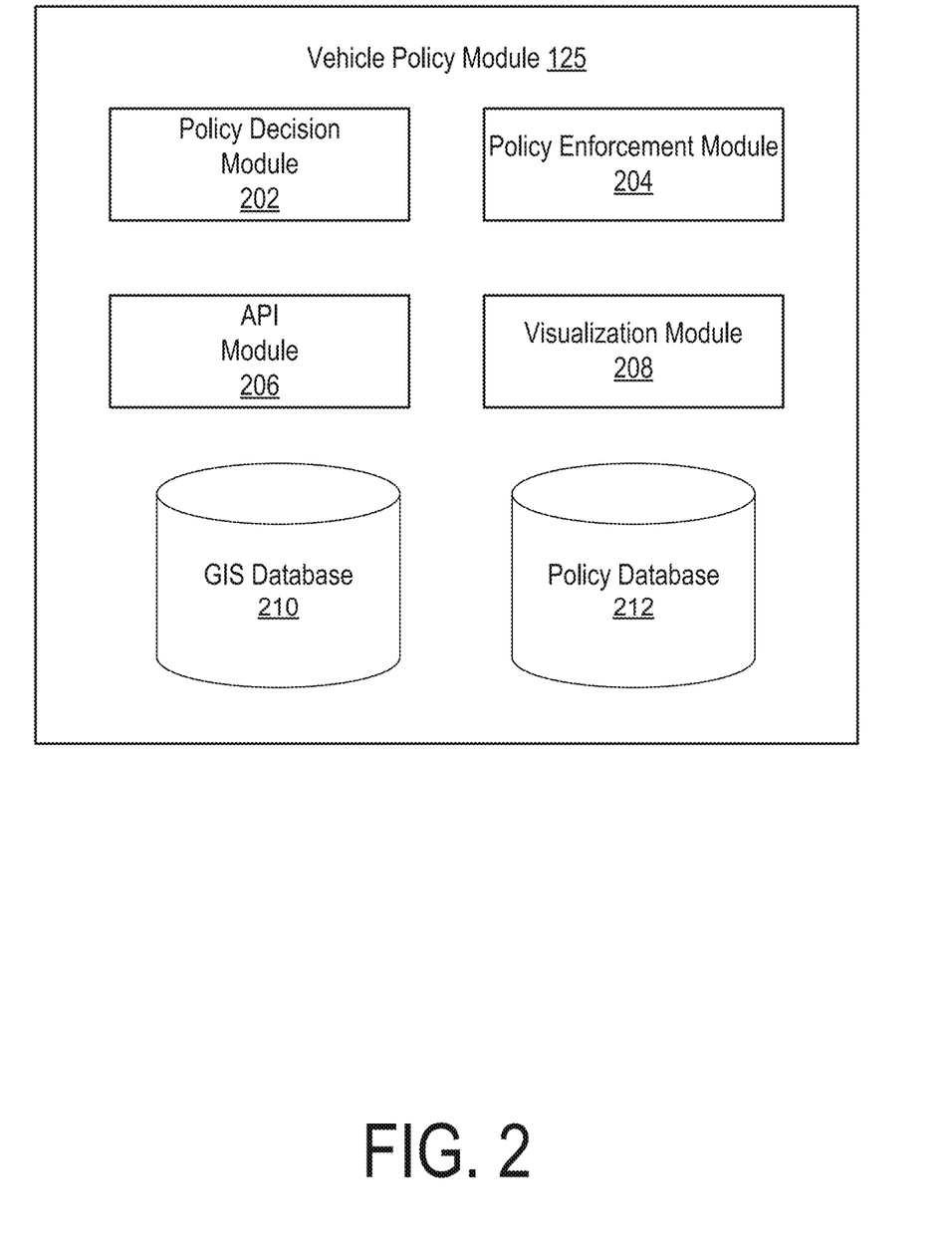
FIG. 2 is a block diagram illustrating an example embodiment of a vehicle policy module for determining and enforcing policies that restrict navigation of a vehicle.

FIG. 2 illustrates an example embodiment of a vehicle policy module 125. The vehicle policy module 125 comprises a policy decision module 202, a policy enforcement module 204, a third party API module 206, a visualization module 208, a geographic information system (GIS) database 210, and a policy database 212. In alternative embodiments, the vehicle policy module 125 can comprise different or additional modules.

The policy database 212 stores a set of policies that constrain movement or other operations of a vehicle 102 or teleoperator supporting a vehicle based on a set of input conditions. For example, the policy database 212 may store policies that restrict a vehicle from traveling in certain geographic areas, traveling on certain road segments, or crossing boundary lines. Alternatively, policies may be framed to limit travel of the vehicle 102 to a set of permitted areas or road segments. In other embodiments, the policy decision database 212 may store policies that constrain other operating constraints of a vehicle 102 or a teleoperator supporting a vehicle 102. The policy database 212 may comprise a set of configurable policies that may be applied to different vehicles 102 so that different constraints may be imposed on different vehicles 102. Some policies may be applicable to an individual vehicle 102 while other policies may be applicable to a fleet of vehicles 102. Furthermore, different policies may result in different decisions or actions and may be based on different combinations of input signals.

The policy database 212 may store some policies that when applied, result in a white list of permitted areas that a vehicle 102 can traverse. Other policies, when applied, may result in a black list of restricted areas that a vehicle 102 is not allowed to traverse.

In some embodiments, policies may be defined in a declarative manner. In alternative embodiments, policies may be defined in a procedural manner, and may involve computations that may optionally depend on one or more input parameters that may be sensed by a vehicle 102, provided by a teleoperator or acquired via other means. Policy effects may be recomputed episodically, periodically or responsive to invocation by other components of the system or by human agents.

In example embodiment, a policy specifies rules for establishing a geographic zone where a vehicle 102 is not allowed to enter based on obtained information relating to judicial or law enforcement decisions applicable to an occupant of a vehicle 102. Such an implementation may be useful to comply with restraining orders issued to any of the vehicle occupants, or other geographical restrictions on the movement of a vehicle 102 or a known occupant of the vehicle 102.

In another example embodiment, a policy limits an area accessible to a vehicle 102 based on cadastral geographic information. For instance, the policy may restrict a vehicle 102 from leaving private property it operates on or restrict the vehicle 102 from entering private property of a party that has explicitly prohibited operation of autonomous or tele-operated vehicles 102. In other embodiments, the policy prohibits a vehicle 102 from traversing public roads or prohibits a vehicle 102 from leaving public roads.

In another example embodiment, a policy limits the areas accessible to a vehicle 102 based on legislative decisions or agreements. For instance, the policy decision module 202 may apply a policy that prohibits a vehicle 102 from crossing municipal, state or national borders, prohibits a vehicle 102 from violating local or federal legislative body decisions about where different types of vehicles 102 are permitted to operate, or prohibits a vehicle 102 from approaching restricted areas such as military bases.

In another example embodiment, a policy may include time-dependent rules that dynamically modify the restricted areas applicable to a vehicle 102 according to the local time. Such policies may be employed to enforce laws or regulations issued by a governing body. For instance, the policy may restrict a vehicle 102 from entering a street that is designated as pedestrian-only on weekends or prohibit a vehicle 102 from violating a nocturnal curfew established in a designated neighborhood. In another example, the policy decision module 202 may implement a parental control policy by enabling an owner of a vehicle 102 to prevent use of a vehicle 102 or restrict its location when occupied by a minor during specified hours.

In another embodiment, a policy may restrict movement of a vehicle 102 based on traffic or emergency alerts acquired from smart roadside infrastructure, VANET communication channels, emergency services, or third party information. For example, a policy may restrict a vehicle 102 from traversing certain lanes or roads disrupted due to an automotive accident. A policy may furthermore operate to lift such restrictions upon determining that the accident is cleared. In another example, a vehicle 102 may be restricted from traversing certain roads in response to event announcements, police actions, emergency vehicle requests, natural or technogenic disaster management orders, special motorcade or cargo convoy movements, or coordination of military deployment on roads and highways.

In another example embodiment, a policy restricts movement of a vehicle 102 based on a vehicle class or physical parameters of the vehicle 102. For instance, a policy may restrict multi-ton cargo vehicles 102 over a threshold size or weight limit from traversing residential streets due to noise regulations, while the policy may permit a light passenger vehicle 102 to traverse the same area.

In another example embodiment, a policy may restrict movement of a vehicle 102 based on quality metrics associated with a remote teleoperator supporting the vehicle 102. For example, the policy may restrict a vehicle 102 from traversing particularly challenging roads while being teleoperated by a teleoperator having a below-threshold skill score determined through a teleoperator evaluation and examination process. In another example, a policy may restrict a vehicle 102 from traversing a particularly challenging road while being operated by an artificial intelligence agent having a below-threshold safety score determined based performance statistics associated with its historical operation.

In another example embodiment, a policy may restrict movement of a vehicle 102 based on information obtained from third-party sources or a server database on permissibility of modes of transport such as toll roads, bridges or ferries. For example, a vehicle 102 may be restricted by the policy from traversing a specific bridge when carrying fewer than three passengers and not being marked as having been paid for such a mode of transport.

In another example, a policy may control whether a vehicle 102 is placed under teleoperation control by a human teleoperator or an artificial intelligence agent. For example, a policy may specify that an artificial intelligence agent takes over control from a human teleoperator upon determining that the human teleoperator has become incapacitated, when the current road situation requires action on a timescale beyond human reaction time (e.g. to avoid an obstacle). In another example, in an environment in which a human teleoperator and an artificial intelligence teleoperator operate from different physical network locations, the policy may switch to the artificial intelligence teleoperator when the network connection between the vehicle 102 and the human teleoperator system does not satisfy minimum safety constraints, but the connection between the vehicle 102 and the artificial intelligence teleoperator system does.

In another example embodiment, the policy decision module 202 may implement a policy that specifies particular routes to take or avoid depending on a current position and desired destination of a vehicle 102. For instance, the policy may specify that a vehicle 102 carrying a dangerous cargo such as inflammable or radioactive materials may be restricted to a list of predefined routes, or may be constrained to stay off specific roads for safety reasons.

The policy decision module 202 receives information about a vehicle 102, vehicle occupants, information about the operating environment, information from third party systems, a current time, or other data and determines one or more relevant policies to apply to the vehicle 102. The policy decision module 202 may update periodically or upon occurrence of certain events to dynamically update the set of policies applicable to a given vehicle 102 at a given time.

The policy enforcement module 204 enforces policies determined to be applicable to a vehicle 102. In an embodiment, the policy enforcement module 204 directly enforces a policy by sending a control signal to a navigation system or autonomous drive system of a vehicle 102 to enforce the policy. In another embodiment, the policy enforcement module 204 sends an instruction to passenger or driver of a vehicle 102 without directly enforcing the policy such that the vehicle occupants can determine whether or not to enforce the policy. For example, the policy enforcement module 204 may notify one or more vehicle occupants using visual notifications such as a heads-up display device or a blinking light, or auditory notifications such as synthetic speech or alarm sounds.

In other embodiments, the policy enforcement module 204 generates instructions to a teleoperation support module 130 to enable a human or artificial intelligence-based teleoperator to carry out the policy. In an embodiment, the policy enforcement module 204 may enforce policies differently depending on whether the vehicle 102 is operating independently or being controlled by a remote teleoperator.

In another embodiment, the policy enforcement module 204 may enforce a policy by issuing an alert to a designated third party without necessarily taking direct action affecting the vehicle 102. For instance, the policy enforcement module 204 may notify law enforcement or legal representatives (e.g., a parent or vehicle owner) of a vehicle occupant that is approaching violation of a policy or has already violated a policy.

In an embodiment, the policy enforcement module 204 may generate a set of geographic boundaries that establish, based on the policy, a geographic area to which the vehicle 102 is constrained or not permitted to enter. The policy enforcement module 204 then generates instructions for a navigation system (e.g., on the vehicle 102 or at a remote teleoperator) that constrains the vehicle 102 to permitted areas. In another example, the policy enforcement module 204 applies a policy to determine specific road segments that a vehicle 102 is allowed or not permitted to traverse and generates instructions for a navigation system that constrains the vehicle 102 to permitted road segments.

In an embodiment, the policy enforcement module 204 may enforce geofencing restrictions by transmitting an instruction for the vehicle 102 to perform an emergency stop when the distance to a geofence boundary falls below a predefined threshold. Alternatively, the instruction may be transmitted when the policy enforcement module 204 estimates that the vehicle 102 will cross the boundary in a time shorter than a predefined threshold at the currently maintained speed, or when other conditions stated in the policy are satisfied.

In another embodiment, the policy enforcement module 204 may instead transmit an instruction to cause a vehicle 102 to travel to a designated parking location, or to dynamically choose and travel to an available parking lot instead of forcing an emergency stop.

In another embodiment, when the vehicle 102 is not under teleoperation control, the policy enforcement module 204 may issue a teleoperator request to enable a teleoperator to take control of the vehicle 102 when the vehicle 102 is approaching a geographic area or road segment that is forbidden by a policy. Similarly, a vehicle 102 that is under control of an artificial intelligence-based teleoperator may be switched to a human teleoperator upon the vehicle 102 approaching a geographic area or road segment forbidden by a policy. In further embodiments, the policy enforcement module 204 may switch control back to an artificial intelligence agent once the vehicle 102 is returned to a permitted area.

The API module 206 provides an API interface that enables authorized users to interact with the vehicle policy module 125. For example, the API module 206 may enable authorized users to update policies associated with one or more vehicles 102, override existing policies, provide input data affecting applicability of one or more policies, or view information relating to operation of the vehicles 102. In an embodiment, the API module 206 may be accessible by, for example, road infrastructure units, law enforcement systems, traffic alert systems, emergency alert systems, vehicle owners, fleet managers, or other systems. For example, in one use case, a policy is configured for alerting a law enforcement agent when an anomaly is detected with operation of a vehicle 102. The anomaly may be detected, for example, by a roadside infrastructure unit that reports the anomalous behavior to the vehicle policy module 125 via the API module 206. Based on application of the relevant policy, a report may be transmitted via the API module 206 to an authorized police officer for review. If the policy officer determines that action should be taken based on the policy, the policy may issue a command via the API module 206 to cause the vehicle 102 to park. The API module 206 then transmits the order to the teleoperation support module 130, which then executes the command to park the vehicle 102 in a permitted location for a closer inspection by an on-site police crew. In another embodiment, the API module 206 may cause alerts to be issued via the teleoperation support module 130 to a remote support terminal 110 to notify a human teleoperator of the parking order via auditory or visual notifications.

The visualization module 208 may generate and present a visualization of a geofencing policy to a vehicle navigation system or to a remote support terminal 110. For example, the visualization module 208 may receive a video stream from the vehicle 102 representing a simulated driver view and overlay visual indicators of geofencing information in an augmented or virtual reality (AR/VR) display view. This view may represent boundaries, permitted road segments, forbidden road segments, or other relevant information using visual elements such as translucent or solid colored polygons, three-dimensional models of virtual warning signs or virtual traffic lights, retexturize road segments lying in restricted areas, or other AR/VR graphics.

In another embodiment, the visualization module 208 may obtain a map display representing a geographic area in a vicinity of the vehicle 102 and overlay geofencing information on the map. Such an overlay may represent currently active geofences with color or pattern lines, or manipulate visual properties such as color scheme of areas beyond geofences (for instance, converting their representation to grayscale), or perform any number of other adaptations. Additionally, such an overlay may also involve a separate representation for recently expired geofences, as well as future announced or expected geofences.

The GIS database 210 stores geospatial information relevant to determining which policies are applicable to different vehicles 102 and to enforcing those policies. For example, the geospatial information database 210 may store maps, environmental data, network connectivity data, traffic patterns, real-time vehicle state information, vehicle occupant profiles, regulatory constraints around geographic areas, vehicle information, or other data relevant to operation of the vehicle policy module 125 as described above. The GIS database 210 may be periodically updated with data from the vehicles 102 or other sources. In an embodiment, the GIS database 210 or portions thereof may be distributed and cached locally on individual vehicles 102 instead of being stored in a policy database 212.

Figure 3:
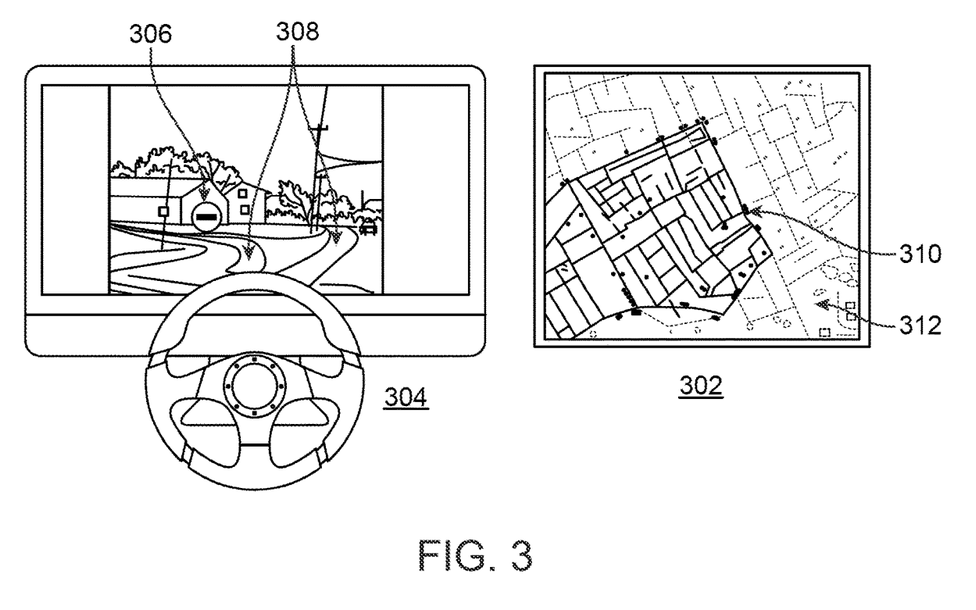
FIG. 3 is an embodiment of a teleoperator workstation displaying visual information relating to navigation restrictions on a vehicle being provided remote support.

FIG. 3 illustrates an example embodiment of a remote support terminal 110 displaying a visualization of geofencing information. Here, the remote support terminal 110 workstation displays a primary video feed display 304 representing a simulated driver's view of a vehicle 102, and a map view 302 provides a number of complementary visual cues to the teleoperator. For instance, the video feed overlay provides an AR stop sign 306 over the restricted road, colored decals 308 rendered over permitted and restricted roads, virtual roadblocks 310 on the map view, and a blur filter 312 over inaccessible map regions.

Figure 4:
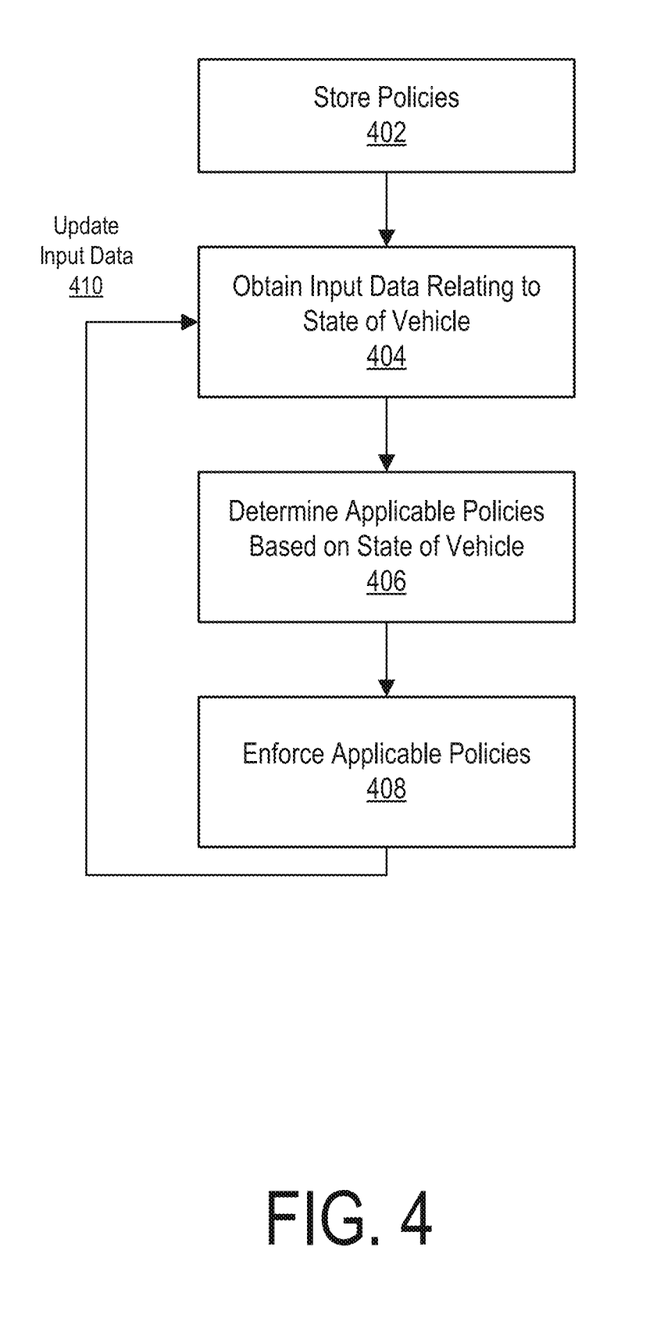
FIG. 4 is a flowchart illustrating an example embodiment of a process for restricting navigation of a vehicle based on policies stored at a remote server.

FIG. 4 is a flowchart illustrating an example embodiment of a process for restricting navigation of a vehicle 102 via interactions with a vehicle policy module 125 on a remote server. A policy database 212 stores 402 a set of policies that specify rules constraining navigation of the vehicle 102 according to any of the techniques described above. Policies may additionally constrain other operating aspects of the vehicle 102 or a teleoperator providing remote support to the vehicle 102. The vehicle policy module 125 obtains 404 input data relating to a state of the vehicle. The state of the vehicle 102 may comprise, for example, a unique identifier of the vehicle 102, location of the vehicle 102, a speed of the vehicle 102, a physical characteristic of the vehicle 102, a capability of the vehicle 102, an identifier of an occupant of the vehicle 102, an identifier of a teleoperator providing remote support to the vehicle 102, environmental conditions in a vicinity of the vehicle, network connectivity data associated with the vehicle 102, or other conditions relating to the vehicle 102, surrounding environment, its occupants, or a teleoperator providing remote support to the vehicle 102. The vehicle policy module 125 determines 406 one or more applicable policies that apply to the vehicle based on the state information. For example, the vehicle policy module 125 may identify which policies specify a set of conditions met by the vehicle state information. The vehicle policy module 125 enforces 408 the applicable policies. Enforcement may be carried out by sending control signals to the vehicle 102 or a teleoperator providing remote support to the vehicle 102. The control signals may directly control operation of the vehicle 102 or teleoperator, or may present guidance (e.g., on a display screen) to enable a vehicle controller (in the vehicle or via teleoperation) to control the vehicle consistent with the policies. The input data may be updated 410 periodically or as conditions change and steps 404, 406, 408 may repeat based on the updated input data. Thus, the application of the policies may dynamically update relative to changing conditions. Furthermore, the application of the policies may dynamically update as policies are updated, deleted, or added (e.g., via the API module 206).

In another embodiment, the policy decision module 202 may be configured to respond to dynamic policy updates that place the vehicle 102 into a forbidden area or road segment without advance warning. For example, if cargo trucks are only allowed to traverse a specific road in the time interval from 2 AM to 6 AM, and the vehicle 102 possessing attributes that allow it to be classified as a cargo truck is traversing that road on 6 AM, the policy enforcement module 204 may instruct the teleoperation support module 130 or in-vehicle controller currently controlling the vehicle 102 to park at a specific parking lot, or provide navigation instructions for abandoning the restricted area via the shortest route. In another example, the policy decision module 202 may instruct the vehicle 102 to perform parking lot discovery and stop whenever the wireless network connection to the agent currently remotely controlling the vehicle 102 is detected to perform worse than a threshold level for a pre-defined duration of time.

In another embodiment, the policy decision module 202 may establish data exchange with navigation software and the policy database 212 in order to determine whether an analyzed route may violate a dynamic policy update expected to be enabled during the time necessary to execute navigation along that route, and whether to remove it from further navigational decision-making process.

Reference in the specification to "one embodiment" or to "an embodiment" means that a particular feature, structure, or characteristic described in connection with the embodiments is included in at least one embodiment. The appearances of the phrase "in one embodiment" or "an embodiment" in various places in the specification are not necessarily all referring to the same embodiment.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps (instructions) leading to a desired result. The steps are those requiring physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations or transformation of physical quantities or representations of physical quantities as modules or code devices, without loss of generality.

However, all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or "determining" or the like, refer to the action and processes of a computer system, or similar electronic computing device (such as a specific computing machine), that manipulates and transforms data represented as physical (electronic) quantities within the computer system memories or registers or other such information storage, transmission or display devices.

Certain aspects of the embodiments include process steps and instructions described herein in the form of an algorithm. It should be noted that the process steps and instructions of the embodiments can be embodied in software, firmware or hardware, and when embodied in software, could be downloaded to reside on and be operated from different platforms used by a variety of operating systems. The embodiments can also be in a computer program product which can be executed on a computing system.

The embodiments also relate to an apparatus for performing the operations herein. This apparatus may be specially constructed for the purposes, e.g., a specific computer, or it may comprise a computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Memory can include any of the above and/or other devices that can store information/data/programs and can be transient or non-transient medium, where a non-transient or non-transitory medium can include memory/storage that stores information for more than a minimal duration. Furthermore, the computers referred to in the specification may include a single processor or may be architectures employing multiple processor designs for increased computing capability.

The algorithms and displays presented herein are not inherently related to any particular computer or other apparatus. Various systems may also be used with programs in accordance with the teachings herein, or it may prove convenient to construct more specialized apparatus to perform the method steps. The structure for a variety of these systems will appear from the description herein. In addition, the embodiments are not described with reference to any particular programming language. It will be appreciated that a variety of programming languages may be used to implement the teachings of the embodiments as described herein, and any references herein to specific languages are provided for disclosure of enablement and best mode.

Throughout this specification, some embodiments have used the expression "coupled" along with its derivatives. The term "coupled" as used herein is not necessarily limited to two or more elements being in direct physical or electrical contact. Rather, the term "coupled" may also encompass two or more elements are not in direct contact with each other, but yet still co-operate or interact with each other, or are structured to provide a thermal conduction path between the elements.

Likewise, as used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus.

In addition, use of the "a" or "an" are employed to describe elements and components of the embodiments herein. This is done merely for convenience and to give a general sense of embodiments. This description should be read to include one or at least one and the singular also includes the plural unless it is obvious that it is meant otherwise. The use of the term and/or is intended to mean any of: "both", "and", or "or."

In addition, the language used in the specification has been principally selected for readability and instructional purposes, and may not have been selected to delineate or circumscribe the inventive subject matter. Accordingly, the disclosure of the embodiments is intended to be illustrative, but not limiting, of the scope of the embodiments.

While particular embodiments and applications have been illustrated and described herein, it is to be understood that the embodiments are not limited to the precise construction and components disclosed herein and that various modifications, changes, and variations may be made in the arrangement, operation, and details of the methods and apparatuses of the embodiments without departing from the spirit and scope of the embodiments.

The invention claimed is:

1. A method for restricting navigation of a vehicle via interactions with a remote server, the method comprising:
storing, at a policy database, a set of policies specifying rules constraining permissible geographic regions where the vehicle is permitted to navigate;
obtaining, from the vehicle, first input data relating to a first state of the vehicle at a first time while the vehicle is controlled by an autonomous drive system of the vehicle;
determining, by a processor, a first set of one or more applicable policies from the set of policies that apply to the vehicle based on the obtained first state of the vehicle;
responsive to detecting that the vehicle is within a threshold distance of restricted geographic region specified by the first set of one or more applicable policies, establishing a teleoperation session with the vehicle by a remote teleoperation server;
transmitting the first set of the one or more applicable policies to the remote teleoperation server to enforce constraints on the teleoperation server in controlling navigation of the vehicle during the teleoperation session in accordance with the one or more applicable policies;
during the teleoperation session, receiving by the remote teleoperation server, sensor data from the vehicle over a network and generating, by the teleoperation server, teleoperation controls to remotely control navigation of the vehicle based on the sensor data in compliance with the one or more applicable policies;
transmitting, by the remote server over the network, the teleoperation controls to the vehicle to control navigation of the vehicle during the teleoperation session; and
responsive to detecting that the vehicle is outside the threshold distance of the restricted region, terminating the teleoperation session and restoring control of the vehicle to the autonomous drive system of the vehicle.

2. The method of claim 1, wherein storing the set of policies comprises:
storing a time-based policy that constrains navigation in a time-dependent manner that is based in part on a local time.

3. The method of claim 1, wherein storing the set of polices comprises:
storing an occupant-based policy that constrains navigation of the vehicle based in part on an identity of one or more occupants of the vehicle.

4. The method of claim 1, wherein storing the set of policies comprise:
storing a cargo-based policy that constrains navigation of the vehicle based in part on an identification of one or more items being transported by the vehicle.

5. The method of claim 1, wherein storing the set of polices comprises:
communicating with an administrator server via an application programming interface that enables an administrator to create or update an administrator-generated policy; and
storing the administrator-generated policy.

6. The method of claim 1, wherein the state of the vehicle comprises at least one of: a unique identifier of the vehicle, location of the vehicle, a speed of the vehicle, a physical characteristic of the vehicle, a capability of the vehicle, an identifier of an occupant of the vehicle, an identifier of a cargo of the vehicle, environmental conditions in a vicinity of the vehicle, and network connectivity data associated with the vehicle.

7. The method of claim 1, wherein storing the set of policies comprises:
storing a whitelist policy comprising identifiers for a set of geographic areas or road segments that the vehicle is allowed to traverse if the state of the vehicle meets a specified set of conditions.

8. The method of claim 1, wherein storing the set of policies comprises:
storing a blacklist policy comprising identifiers for a set of geographic areas or road segments that the vehicle is prohibited from traversing if the state of the vehicle meets a specified set of conditions.

9. A non-transitory computer-readable storage medium storing instructions for restricting navigation of a vehicle via interactions with a remote server, the instructions when executed by a processor causing the processor to perform steps comprising:
storing, at a policy database, a set of policies specifying rules constraining permissible geographic regions where the vehicle is permitted to navigate;
obtaining, from the vehicle, first input data relating to a first state of the vehicle at a first time while the vehicle is controlled by an autonomous drive system of the vehicle;
determining, by a processor, a first set of one or more applicable policies from the set of policies that apply to the vehicle based on the obtained first state of the vehicle;
responsive to detecting that the vehicle is within a threshold distance of restricted geographic region specified by the first set of one or more applicable policies, establishing a teleoperation session with the vehicle by a remote teleoperation server;
transmitting the first set of the one or more applicable policies to the remote teleoperation server to enforce constraints on the teleoperation server in controlling navigation of the vehicle during the teleoperation session in accordance with the one or more applicable policies;
during the teleoperation session, receiving by the remote teleoperation server, sensor data from the vehicle over a network and generating, by the teleoperation server, teleoperation controls to remotely control navigation of the vehicle based on the sensor data in compliance with the one or more applicable policies;
transmitting, by the remote server over the network, the teleoperation controls to the vehicle to control navigation of the vehicle during the teleoperation session; and
responsive to detecting that the vehicle is outside the threshold distance of the restricted region, terminating the teleoperation session and restoring control of the vehicle to the autonomous drive system of the vehicle.

10. The non-transitory computer-readable storage medium of claim 9, wherein storing the set of policies comprises:
storing a time-based policy that constrains navigation in a time-dependent manner that is based in part on a local time.

11. The non-transitory computer-readable storage medium of claim 9, wherein storing the set of polices comprises:
storing an occupant-based policy that constrains navigation of the vehicle based in part on an identity of one or more occupants of the vehicle.

12. The non-transitory computer-readable storage medium of claim 9, wherein storing the set of policies comprise:
storing a cargo-based policy that constrains navigation of the vehicle based in part on an identification of one or more items being transported by the vehicle.

13. The non-transitory computer-readable storage medium of claim 9, wherein storing the set of polices comprises:
communicating with an administrator server via an application programming interface that enables an administrator to create or update an administrator-generated policy; and
storing the administrator-generated policy.

14. The non-transitory computer-readable storage medium of claim 9, wherein the state of the vehicle comprises at least one of: a unique identifier of the vehicle, location of the vehicle, a speed of the vehicle, a physical characteristic of the vehicle, a capability of the vehicle, an identifier of an occupant of the vehicle, an identifier of a cargo of the vehicle, environmental conditions in a vicinity of the vehicle, and network connectivity data associated with the vehicle.

15. The non-transitory computer-readable storage medium of claim 9, wherein storing the set of policies comprises:
storing a whitelist policy comprising identifiers for a set of geographic areas or road segments that the vehicle is allowed to traverse if the state of the vehicle meets a specified set of conditions.

16. The non-transitory computer-readable storage medium of claim 9, wherein storing the set of policies comprises:
storing a blacklist policy comprising identifiers for a set of geographic areas or road segments that the vehicle is prohibited from traversing if the state of the vehicle meets a specified set of conditions.

17. A computer system comprising:
a processor; and
a non-transitory computer-readable storage medium storing instructions for restricting navigation of a vehicle via interactions with a remote server, the instructions when executed by the processor causing the processor to perform steps comprising:
storing, at a policy database, a set of policies specifying rules constraining permissible geographic regions where the vehicle is permitted to navigate;
obtaining, from the vehicle, first input data relating to a first state of the vehicle at a first time while the vehicle is controlled by an autonomous drive system of the vehicle;
determining, by a processor, a first set of one or more applicable policies from the set of policies that apply to the vehicle based on the obtained first state of the vehicle;

responsive to detecting that the vehicle is within a threshold distance of restricted geographic region specified by the first set of one or more applicable policies, establishing a teleoperation session with the vehicle by a remote teleoperation server;

transmitting the first set of the one or more applicable policies to the remote teleoperation server to enforce constraints on the teleoperation server in controlling navigation of the vehicle during the teleoperation session in accordance with the one or more applicable policies;

during the teleoperation session, receiving by the remote teleoperation server, sensor data from the vehicle over a network and generating, by the teleoperation server, teleoperation controls to remotely control navigation of the vehicle based on the sensor data in compliance with the one or more applicable policies;

transmitting, by the remote server over the network, the teleoperation controls to the vehicle to control navigation of the vehicle during the teleoperation session; and responsive to detecting that the vehicle is outside the threshold distance of the restricted region, terminating the teleoperation session and restoring control of the vehicle to the autonomous drive system of the vehicle.

18. The computer system of claim 17, wherein storing the set of policies comprises:

storing a time-based policy that constrains navigation in a time-dependent manner that is based in part on a local time.

19. The computer system of claim 17, wherein storing the set of polices comprises:

storing an occupant-based policy that constrains navigation of the vehicle based in part on an identity of one or more occupants of the vehicle.

20. The computer system of claim 17, wherein storing the set of policies comprise:

storing a cargo-based policy that constrains navigation of the vehicle based in part on an identification of one or more items being transported by the vehicle.

\* \* \* \* \*